United States Patent [19]
Bucy et al.

[11] 3,900,851
[45] Aug. 19, 1975

[54] MULTI-CHANNEL WIDEBAND OSCILLOGRAPH

[75] Inventors: Shawn G. Bucy, Fairborn; John Takacs, New Carlisle, both of Ohio

[73] Assignee: Abex Corporation, New York, N.Y.

[22] Filed: Jan. 7, 1974

[21] Appl. No.: 431,268

[52] U.S. Cl. ................... 346/49; 346/108; 350/161
[51] Int. Cl.² ................................................ G01D 9/30
[58] Field of Search ................ 346/49, 108; 350/161

[56] References Cited
UNITED STATES PATENTS

| | | | |
|---|---|---|---|
| 3,055,258 | 9/1962 | Hurvitz | 346/108 X |
| 3,531,184 | 9/1970 | Adler | 350/161 |
| 3,534,166 | 10/1970 | Korpel | 178/6.7 |
| 3,744,039 | 7/1973 | Hrbek et al. | 350/161 X |

*Primary Examiner*—Joseph W. Hartary
*Attorney, Agent, or Firm*—Kinzer, Plyer, Dorn & McEachran

[57] ABSTRACT

A laser beam is passed through a Bragg cell driven by a plurality of voltage controlled oscillators having different center frequencies. The voltage controlled oscillators are modulated by analog voltage waveforms representative of various discrete signals. The Bragg cell divides the laser beam into separate beams, one for each voltage controlled oscillator, with each beam deflected in accord with the signal. Moving photo-sensitive recording paper makes a simultaneous record of the independently modulated beams providing a multi-trace oscillograph recording of the signals.

1 Claim, 2 Drawing Figures

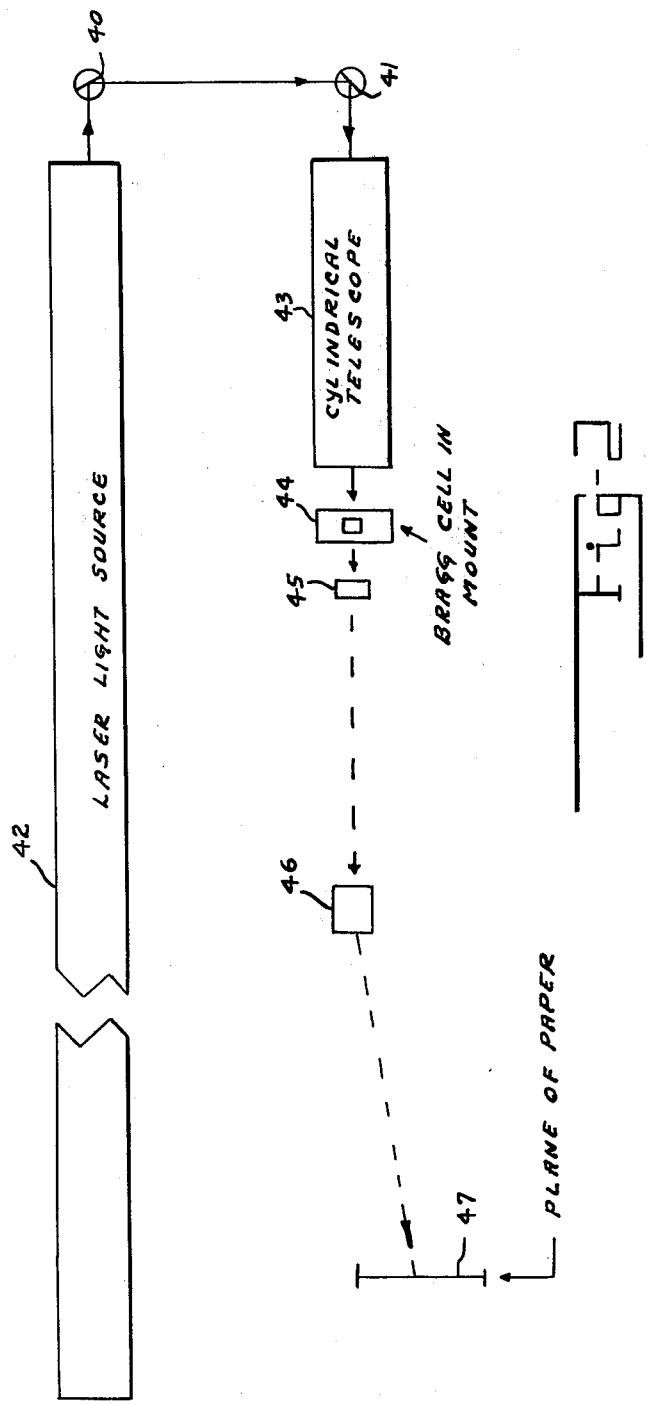

MULTI-CHANNEL WIDEBAND OSCILLOGRAPH

RIGHTS OF THE GOVERNMENT

There is reserved to the Government of the United States a non-exclusive, irrevocable, royalty-free license in the invention described herein with power to grant licenses for all government purposes.

BACKGROUND OF THE INVENTION

The field of the invention is in the multi-channel oscillograph art.

Multi-channel chart recorders and oscillographic recording devices have been well known for many years. The response characteristics of these well known devices are limited by the physical movement characteristics of the springs, mirrors and other physically moving elements used to position-modulate beamlets from conventional light sources. The upper frequency limit of these devices has generally been of the order of 15kHz. Recording oscilloscopes employing cathode-ray tubes, fiber optics, and a recording medium are known and in use. They are generally quite difficult to construct, expensive, and the maintaining of a vacuum seal with the fiber optics has been difficult.

The deflection of laser beams by an acoustic-optic crystal, commonly referred to as a Bragg cell, is also known. "A Television Display Using Acoustic Deflection and Modulation of Coherent Light", by Korpel, Adler, Desmares, and Watson at pages 1429 to 1437 of the PROCEEDINGS OF THE IEEE, Vol. 54, No. 10, for October, 1966, and "Acousto-Optic Device Deflects Laser" at pages 42 and 43 in ELECTRONICS, dated Aug. 16, 1973, are typical examples of techniques using Bragg devices to deflection modulate laser beams. A final technical report, number P20523, on "The Development of an Acousto-Optic Spectrum Analyzer" by D. L. Hecht, published by the Applied Technology division of Itek Corporation discloses the use of a Bragg cell in a spectrum analyzer.

SUMMARY OF THE INVENTION

A multiple trace, photo-recording, oscillograph having a much larger bandwidth (DC to 50kHz per channel) than previously available is provided by the invention.

BRIEF DESCRIPTION OF THE DRAWING

FIG. 2 is a schematic diagram of a typical optical path arrangement of an embodiment of the invention.

DESCRIPTION OF THE PREFERRED EMBODIMENTS

Figure 1:
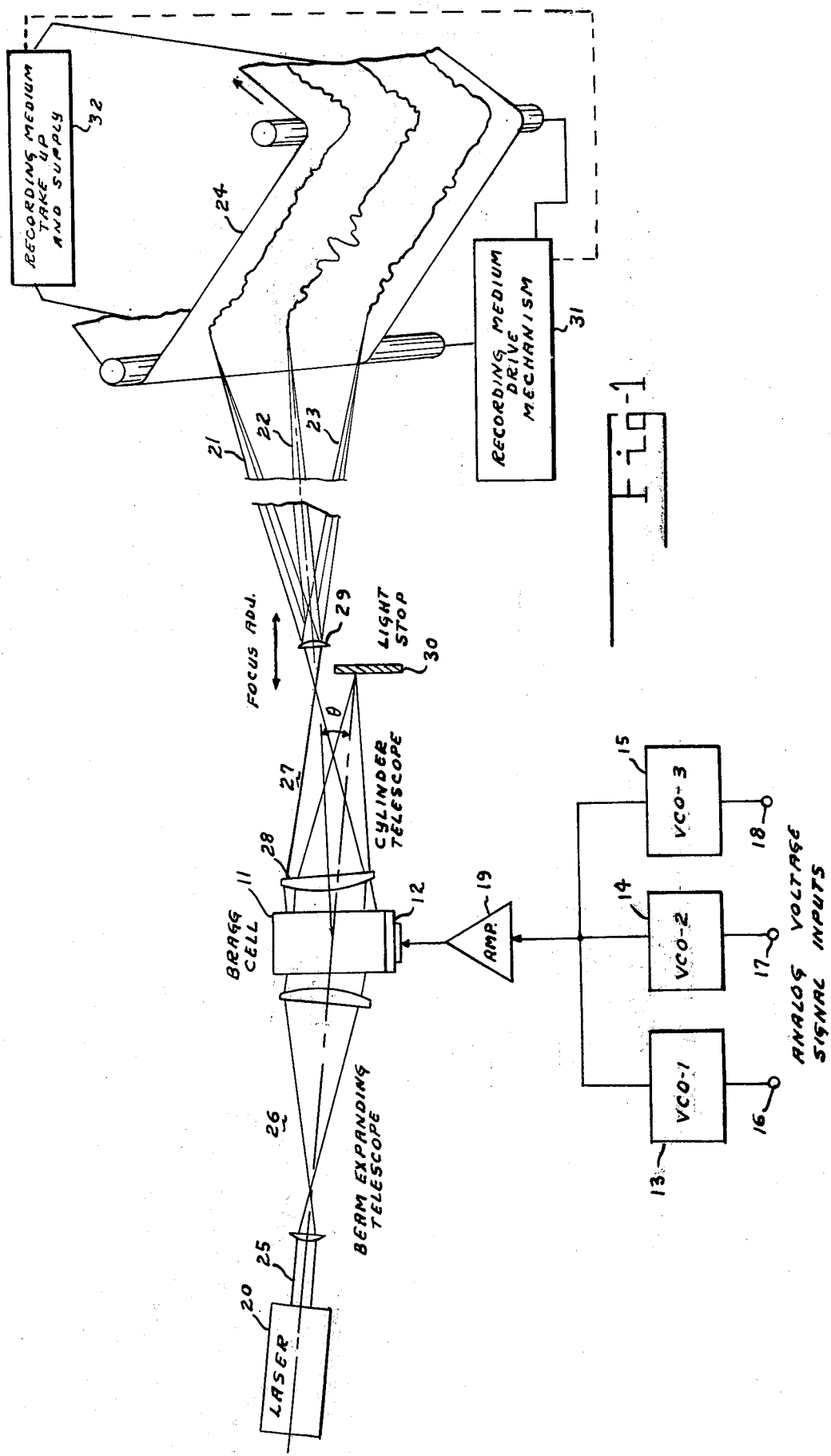
FIG. 1 is a block-schematic diagram of an embodiment of the invention.

The invention is a novel combination of commercially available elements to provide an improved multi-channel recording oscillograph. The embodiment of the invention shown in FIG. 1 is representative of a three channel recording oscillograph. More, or fewer, recording channels may be used in the invention. The limiting requirement on the number of channels is that the sum of the bandwidths of the recording channels must not exceed the total bandwidth capabilities of the Bragg cell. For instance, in a particular embodiment, as represented in FIG. 1, the Bragg cell 11 and associated transducer 12 has a useable bandwidth input capability (bandwidth at 3 db down points) from 46 MHz to 91 MHz. This 45 MHz bandwidth is divided into three channels with each channel then having approximately a theoretical capability of ± 7.5 MHz deflection before trace overlap would occur. In the particular embodiment being described the center frequency of the voltage controlled oscillators 13, 14 and 15 were set at 55 MHz, 67.5 MHz, and 80 MHz respectively. (While in this embodiment the channels are at equal steps within the Bragg cell frequency window, that is not a requirement.) Each of the VCO's have independent gain controls to vary (and make approximately equal, if so desired) the relative intensity of its associated recording light beam.

The individual analog (voltage-versus-time) signals to be recorded are applied to the inputs 16, 17 and 18 of the VCO's. VCO's are commercially available having a frequency range from 50 MHz to 2 GHz with a frequency modulation capability of ± 5 MHz at rates up to 1 MHz. The center frequency about which FM occurs is manually set in this embodiment at approximately 55 MHz for VCO-1, 67.5 MHz for VCO-2, and 80 MHz for VCO-3. Conventional broad-band amplifier 19 amplifies the three carrier frequencies, frequency modulated in accord with their respective input signals, and applies the composite signal to the transducer 12 of the Bragg cell 11. The Bragg cell deflects a component of the laser beam from conventional laser 20 through an angle $\theta$ dependent upon the acoustic frequency to which it is excited by the transducer 12. In this particular embodiment with three carrier frequencies, applied to the cell, three beams 21, 22 and 23 respectively, emerge from the cell.

The frequency of the laser light source 20 and the responsefrequency characteristics of the recording medium 24 should be chosen such that they are compatible. In a typical embodiment of the invention, a Helium-Cadmium, continuous wave laser having an output wavelength range in the range of 4000–4500 Angstroms, and Linagraph direct print paper recording medium (such as Kodak type number 1895) functioned satisfactorily. The conventional laser used in the embodiment has a dispersion of 0.5m radians. It is desired that the Bragg cell optical aperture be approximately fully illuminated by the laser beam. Since Bragg cell apertures are generally considerably larger than the diameter of an unmodified laser output beam it is desirable to optically expand the conventional laser beam 25 by a conventional expanding telescope 26 so that the Bragg cell aperture is covered, or nearly so, by the laser beam. In this particular embodiment an approximately 40× cylindrical telescope was satisfactory.

The signal output beams from the Bragg cell are directed and focused on the recording medium 24 by the cylindrical telescope 27. Two conventional lens systems, cylindrical objective lens system 28 and projection lens system 29, are used to focus the optical output of the Bragg cell on the photo-sensitive recording paper 24. An optical mask 30 is positioned within the cylindrical telescope to eliminate any direct beam and other extraneous laser light from being emitted through the telescope.

Conventional variable, or fixed speed recording medium transport mechanisms 31 and 32 move the recording medium 24 in the conventional manner. In some instances where undesirable extraneous light is being admitted from the telescope 27, that is not stopped by the light stop 30, the beams 21, 22 and 23 are passed through a vertical slit in a light mask positioned over and adjacent the recording medium. Generally the response time of the apparatus will be determined by practical paper speeds. The previously mentioned DC to 50 KHz bandwidth per channel has been found to be a typical figure for practical paper speeds. It is to be noted that the electrical and optical bandwidth capabilities of the circuit greatly exceed this figure.

FIG. 2 shows the light path in a typical embodiment of the invention. To minimize the size of the device, two conventional front-silvered optical mirrors 40 and 41 in conventional mounts were used to fold the path of the unexpanded laser beam. In this particular representative embodiment of the invention, the Helium-Cadmium continuous wave, 50 milliwatt, laser 42 emitting monochromatic, coherent light had a length of approximately 190 cm, the first folding mirror 40 was approximately 10 cm from the laser and the second mirror 41 was approximately 30 cm from the first. The cylindrical telescope 43 had a magnification of approximately 36.8×, an optical aperture of 40 mm, and a length of 40 cm. The Bragg cell in its mount 44 was positioned approximately 8 cm from the telescope 43. A conventional lead molybdate ($PbMoO_4$) type SF8 glass cell with a lithium niobate ($LiNbO_3$) transducer was used. The bandwidth (3 db down points) was 45 MHz (46 MHz to 91 MHz, operating range), the storage time of the cell-transducer system was less than 10 $\mu$sec. A conventional three dimensional positioning and mounting base supported the cell assembly. The 40 mm objective lens 45 with a focal length of approximately 40 cm was positioned approximately 8 cm from the Bragg cell. The conventional projection lens 46 (such as a Nikon type Auto Nikkor-N) was positioned at approximately 40 cm from the objective lens and adjusted to focus the beams on the recording medium 47 approximately 45 cm away.

We claim:

1. A multi-channel recording oscillograph for recording oscillographic traces of a plurality of analog voltage input signals comprising:
   a. a plurality of voltage controlled frequency modulated oscillators, wherein a separate voltage controlled oscillator is associated with and receives a particular input signal of the said plurality of input signals and provides a separate, respective, determined bandwidth frequency modulated output signal responsive to its said input signal;
   b. a broadband amplifier receiving the said output signals from the said plurality of voltage controlled oscillators and providing a composite output signal of the said signals from the said plurality of voltage controlled oscillators;
   c. an acousto-optic Bragg cell having a coupled transducer, a determined optical aperture, and a bandwidth of operation at least equal to the sum of the said bandwidths of the said plurality of voltage controlled oscillators;
   d. means for applying the output of the said broadband amplifier to the said transducer of the Bragg cell;
   e. a laser providing a continuous wave beam of monochromatic coherent light;
   f. a beam expanding telescope cooperating with the said laser beam expanding the said laser beam to approximately the size of the said determined optical aperture of the Bragg cell and directing the said expanded beam onto the said aperture
   g. a moving photo-sensitive recording medium, photo responsive to the said monochromatic laser light;
   h. a focusing telescope receiving the laser light passing through the said Bragg cell focusing the deflected laser light, formed into individual beams respective to each of the said plurality of oscillators by the said Bragg cell, onto the said moving photo-sensitive recording medium; and
   i. an optical mask positioned within the said focusing telescope for preventing any direct beam of laser light from being emitted through the said focusing telescope.

* * * * *

UNITED STATES PATENT OFFICE
CERTIFICATE OF CORRECTION

PATENT NO. : 3,900,851

DATED : 19 August 1975

INVENTOR(S) : Shawn G. Bucy, Fairborn; John Takacs, New Carlisle, both of Ohio

It is certified that error appears in the above—identified patent and that said Letters Patent are hereby corrected as shown below:

At page 1, column 1, delete "/73/ Assignee: Abex Corporation, New York, N. Y.

At page 1, column 2, after ... Firm-- insert "Joseph E. Rusz; Robert K. Duncan"

Signed and Sealed this sixteenth Day of December 1975

[SEAL]

Attest:

RUTH C. MASON
*Attesting Officer*

C. MARSHALL DANN
*Commissioner of Patents and Trademarks*